Patented Apr. 9, 1940

2,196,581

UNITED STATES PATENT OFFICE 2,196,581

MANUFACTURE OF ORGANIC ACIDS FROM ALCOHOLS

Wilbur T. Stephenson and Earl L. Pelton, Midland, Mich., assignors to The Dow Chemical Company, Midland, Mich., a corporation of Michigan No Drawing. Application September 15, 1938, Serial No. 230,112

13 Claims. (Cl. 260—531)

This invention concerns an improved method for the manufacture of aliphatic carboxylic acids or their alkali metal salts from alcohols by oxidation of the latter with alkali metal hydroxides.

It is well known that a primary or secondary alcohol containing 2 or more carbon atoms may be oxidized by heating with an alkali metal hydroxide to produce a salt of an aliphatic carboxylic acid. The reaction, when employing a primary alcohol, is illustrated by the equation:

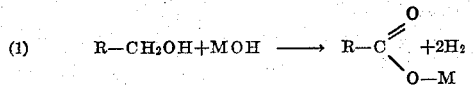

wherein R is an alkyl group and M an alkali metal. The oxidation of a secondary alcohol usually occurs in accordance with the equation:

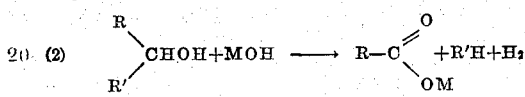

wherein R and R' each represent an alkyl group and the number of carbon atoms in group R is equal to or greater than the number in group R'.

However, such oxidation of an alcohol with an alkali metal hydroxide is often accompanied by undesirable side reactions such as dehydration of the alcohol to form olefines and decomposition of the desired salt product under the reaction conditions employed. Guerbet, Bull. Soc. Chim. (4) 11 164–9 (1912), reports that the alcohols containing from 2 to 7 carbon atoms undergo excessive decomposition into olefines and other by-products when heated to a reaction temperature with alkali metal hydroxides.

In recent years certain methods for carrying out the oxidation have been discovered which are said to avoid excessive by-product formation and to give good yields of alkali metal salts of the desired acids, but these methods involve hazardous or difficult and expensive operating procedures which are disadvantageous from a manufacturing viewpoint. For instance, Reid in U. S. Patent No. 1,856,236 reports that the oxidation may be accomplished without appreciable by-product formation by heating an alkali metal hydroxide, in pure or aqueous form, in an autoclave with an excess of the alcohol to a temperature above 300° C. at a pressure greater than 100 atmospheres. Obviously, this method is hazardous, since it involves handling a highly combustible mixture of hydrogen and alcohol under pressure at high temperatures. Also, the patent points out that a considerable excess of alcohol must be employed in order to produce the salt product in high yield. Pelton et al., in U. S. Patents Nos. 1,926,059, 1,926,068, 1,934,648, and 1,961,625, have shown that alcohols may be oxidized with alkali metal hydroxides to produce salts of organic acids in good yield by introducing the alcohols gradually into fused mixtures of sodium and potassium hydroxides maintained at temperatures between 200° and 325° C. This method, though giving excellent yields and permitting operation at atmospheric pressure, is disadvantageous in that it produces a mixture of sodium and potassium salts. If a single salt is desired, extra steps for separation of the sodium and potassium salts are necessary. If the free organic acid is to be produced, steps for recovering the potassium, e. g. as potassium hydroxide suitable for reemployment, are required in order to render the process economical.

An object of this invention is to provide a simple method whereby a primary or secondary alcohol containing 2 or more carbon atoms may be oxidized at atmospheric pressure or thereabout with a single solid alkali or a mixture of solid alkalies to produce a salt of an aliphatic carboxylic acid in good yield. Other objects will be apparent from the following description of the invention.

We are aware that salts of aliphatic acids have been prepared on laboratory scale by passing alcohol vapors through a heated tube containing a stationary body of solid alkali, but such operation involves employment of a large excess of alcohol and under such operating conditions the lower alcohols react slowly at temperatures below those at which the desired salt products suffer decomposition.

We have now discovered that the primary and secondary alcohols containing 2 or more carbon atoms in the molecule may be reacted smoothly and rapidly with a finely divided alkali metal hydroxide at temperatures below those at which the salt product is appreciably decomposed, provided that the alcohol vapors are caused to pass through the finely divided alkali while stirring the latter so as to continually expose fresh surfaces of alkali to the alcohol.

We have further found that, although the reaction may be somewhat sluggish at the start when the alkali metal hydroxide is the only solid present, as soon as a small amount of the salt product is formed the rate of reaction is increased markedly. The rate of reaction may be increased further by raising the temperature as the reaction progresses, since a mixture of alkali and the salt product fuses at a higher temperature than the alkali alone and the partially reacted mixture may be heated without fusion to a temperature higher than would be possible at the start of the reaction. Accordingly, by starting the reaction with a mixture of alkali metal hydroxide and an alkali metal salt of an aliphatic acid, rather than the hydroxide alone, the initial sluggishness of the reaction may be avoided.

We have also found that when the reaction is carried out with stirring as hereinbefore specified, the optimum rate of reaction is maintained until about two-thirds of the alkali is consumed, i. e. until the mixture contains a major proportion of the desired salt product and only a minor proportion of unreacted alkali. By adding fresh alcohol and alkali metal hydroxide, either continuously or intermittently, at the rates necessary to maintain a reaction mixture of optimum reactivity containing a molecular excess of salt product over the unreacted alkali and discharging an equal amount of reacted material, manufacture of the salt may be carried out continuously under optimum reaction conditions. Under such improved procedure, the process may be rendered nearly self-sustaining thermally, since heat evolved by the reaction may be utilized to maintain the reaction temperature.

In practicing the invention, a powdered or otherwise comminuted alkali metal hydroxide, or preferably a powdered mixture of such hydroxide and between 1 and 3 molecular equivalents of a salt corresponding to the desired product, is heated at a temperature above 250° C. but below its fusion point, e. g. between 250° and 320° C. and preferably between 270° and 300° C. The alkali metal hydroxide may be sodium or potassium hydroxide or a mixture thereof, but sodium hydroxide, being least expensive, is preferred. A small proportion, e. g. 0.02–0.2 molecular equivalent, of potassium hydroxide may advantageously be used per mole of sodium hydroxide, since we have found that such small amount of potassium hydroxide is effective in promoting rapid reaction and that it does not interfere seriously with subsequent separation of the sodium salt nor add greatly to the cost of operation. Alcohol is introduced in such manner that its vapors must pass through the hot comminuted alkaline mass, while stirring the latter so as to break up the mass and continually expose fresh surfaces of alkali to the alcohol. Contact of the alcohol with the heated alkali sometimes causes partial liquification with formation of a thick slurry, but the temperature is controlled so as to avoid complete fusion of the alkali, since the reaction proceeds more rapidly with finely divided and well stirred solid alkali than with fused alkali. By operating in this manner, the alcohol may be consumed almost completely during contact with the alkali so that the vent gas is nearly pure hydrogen or a mixture of hydrogen and a saturated hydrocarbon, depending upon whether a primary or secondary alcohol is employed. Little, if any, alcohol need be lost in the vent gas and the reaction with the solid alkali proceeds rapidly enough at temperatures between 250° and 325° C. under the conditions just described so that the salt product does not decompose appreciably in the reaction period required. If desired, the introduction of alcohol may be continued until the alkali is almost entirely reacted, care being taken of course not to introduce it more rapidly than it can be absorbed. In practice, however, fresh alcohol and alkali metal hydroxide are added gradually and a portion of the mixture is withdrawn, the rates of addition of fresh reactants and withdrawal of reacted mixture being regulated so as to maintain a reacting mass of nearly constant size containing a molecular excess of the salt product. Usually the alkali and alcohol are added in the proportions of about 1.5 mols of alkali per mol of alcohol.

The mixture withdrawn from the reaction during such continuous operation is a mixture of an alkali metal hydroxide and the desired salt product, the latter being in molecular excess. This mixture may be dissolved in water and the salt may be crystallized and separated in pure form from the solution by conventional procedure. The alkaline mother liquor is then evaporated to recover the unreacted alkali metal hydroxide in a form suitable for re-employment in the process.

When a free aliphatic acid is desired, its salt, obtained as above-described, is treated with a strong mineral acid, e. g. hydrochloric or sulphuric acid, and the organic acid liberated by the treatment is separated in the usual way.

The following examples illustrate certain ways in which the principle of the invention has been applied, but are not to be construed as limiting the invention.

*Example 1*

Sodium propionate was manufactured in continuous manner by heating a mixture of about 1 molecular proportion of flaked sodium hydroxide and 2 mols of sodium propionate to a temperature of about 250° C. and gradually adding secondary butyl alcohol and additional sodium hydroxide, while stirring, the additions being made at such rates as to maintain a mixture having the composition just given and in such manner that the alcohol vapors were caused to pass into the stirred mass. Portions of the reacted mixture were withdrawn periodically, the rate of withdrawl being controlled so as to maintain in the reactor a nearly constant inventory of the reacting mixture. The reaction temperature during operation varied from 245° to 295° C. The gas evolved was largely hydrogen and methane, but it contained a small proportion of unreacted secondary butyl alcohol which was recovered by passing the gas through coolers to condense the alcohol. In the period over which the continuous process was studied, there were introduced to the reaction a total of 4640 pounds (116 pound mols) of sodium hydroxide and 6488 pounds (87.6 pound mols) of secondary butyl alcohol and there were discharged from the reactor 9140 pounds of a mixture containing 7716 pounds (80.3 pound mols) of sodium propionate and 1425 pounds (35.6 pound mols) of sodium hydroxide. From the vent gas 540 pounds (7.3 pound mols) of secondary butyl alcohol was recovered. At the close of the period over which the continuous process was studied the reactor contained substantially the same charge as at the start of the study. The yield of sodium propionate was nearly quantitative, based both on the alcohol and on the sodium hydroxide consumed.

*Example 2*

Iso-amyl alcohol was passed gradually into technically pure flaked sodium hydroxide heated to a temperature of approximately 300° C. while continuously stirring the reaction mixture. The alcohol was added at such rate that it was nearly all consumed during contact with the alkali and the introduction of alcohol was continued until nearly all of the sodium hydroxide was consumed. The reaction was somewhat sluggish in starting, but once started, proceeded smoothly and rapidly until about two-thirds of the sodium hydroxide was consumed, after which it slowed down somewhat. The reacted mixture contained 91.2 per cent by weight of sodium isovalerate and only 1.9 per cent of sodium hydroxide, the remainder being other salts such as sodium carbonate and sodium chloride which were present in the sodium hydroxide employed. The yield of sodium isovalerate, based on the sodium hydroxide initially used, was approximately 94 per cent of theoretical.

By operating as illustrated in the above specific examples we have also oxidized: Ethyl alcohol by reaction with sodium hydroxide to obtain sodium acetate; normal propyl alcohol with sodium hydroxide to obtain sodium propionate; isopropyl alcohol with sodium hydroxide to obtain sodium acetate; methyl isobutyl carbinol with sodium hydroxide to obtain sodium isovalerate; and secondary butyl alcohol with a finely divided mixture of solid sodium and potassium hydroxides and propionates, containing about 22 mols of the sodium compounds per mol of the potassium compounds, to obtain additional sodium propionate. In all instances the reaction proceeded smoothly without appreciable by-product formation to produce the desired salt in good yield. Other alcohols such as nonyl alcohol, cetyl alcohol, methyl heptyl carbinol, etc., may likewise be oxidized to obtain salts of the corresponding aliphatic acids. The invention may be applied in oxidizing any primary or secondary alcohol, but it is particularly advantageous when applied in oxidizing the lower alcohols containing from 2 to 7 carbon atoms.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making an alkali metal salt of an aliphatic carboxylic acid, the step of contacting an alcohol selected from the class consisting of primary and secondary alcohols with a finely divided alkali metal hydroxide while stirring and heating the mixture at a temperature between 250° and 320° C.

2. The method of making an alkali metal salt of an aliphatic carboxylic acid which comprises oxidizing an alcohol selected from the class consisting of primary and secondary alcohols by contacting the same with a solid but finely divided mixture of an alkali metal hydroxide and the salt corresponding to that formed by the reaction while stirring and heating the mixture at a temperature between 250° and 320° C.

3. The method of making an alkali metal salt of an aliphatic carboxylic acid which comprises oxidizing an alcohol selected from the class consisting of primary and secondary alcohols by passing the same into a finely divided reaction mixture comprising a solid alkali metal hydroxide and the salt corresponding to that formed by the reaction while stirring and heating the mixture at temperatures between 270° and 300° C.

4. The method of making a salt of an aliphatic carboxylic acid which comprises oxidizing an alcohol selected from the class consisting of primary and secondary alcohols by contacting the same with finely divided sodium hydroxide while stirring and heating the reaction mixture at a temperature between 270° and 300° C.

5. The method of making an alkali metal salt of an aliphatic carboxylic acid which comprises oxidizing an alcohol selected from the class consisting of primary and secondary alcohols by contacting the same with a finely divided mixture of sodium and potassium hydroxides containing at least 5 mols of sodium hydroxide per mol of potassium hydroxide while stirring and heating the mixture at temperatures between 250° and 325° C.

6. A method for the continuous production of an alkali metal salt of an aliphatic carboxylic acid which comprises gradually adding an alkali metal hydroxide and an alcohol selected from the class consisting of primary and secondary alcohols to a finely divided reaction mixture containing a major proportion of the salt corresponding to that produced by oxidation of the alcohol and a minor proportion of an alkali metal hydroxide while stirring and heating the mixture at a temperature between 250° and 320° C. and withdrawing the reacted mixture at such rate as to maintain a charge in the reaction zone.

7. A method for the continuous production of a sodium salt of an aliphatic carboxylic acid which comprises gradually adding sodium hydroxide and an alcohol selected from the class consisting of primary and secondary alcohols to a finely divided reaction mixture containing a major proportion of the salt corresponding to that produced by oxidation of the alcohol and a minor proportion of sodium hydroxide while stirring and heating the mixture at a temperature between about 270° and about 300° C. and withdrawing the reacted mixture at such rate as to maintain a substantially constant charge in the reaction zone.

8. A method for the production of sodium propionate which comprises contacting secondary butyl alcohol with finely divided sodium hydroxide while stirring and heating the reaction mixture at a temperature between 250° and 320° C.

9. A method for the production of sodium propionate which comprises passing secondary butyl alcohol into a finely divided reaction mixture containing a major proportion of sodium propionate and a minor proportion of sodium hydroxide while stirring and heating the reaction mixture at a temperature between 270° and 300° C.

10. A method for the production of sodium propionate which comprises contacting n-propyl alcohol with finely divided sodium hydroxide while stirring and heating the reaction mixture at a temperature between 250° and 320° C.

11. A method for the production of sodium propionate which comprises passing n-propyl alcohol into a finely divided reaction mixture containing a major proportion of sodium propionate and a minor proportion of sodium hydroxide while stirring and heating the reaction mixture at a temperature between 270° and 300° C.

12. A method for the production of sodium acetate which comprises contacting ethyl alcohol with finely divided sodium hydroxide while stirring and heating the reaction mixture at a temperature between 250° and 320° C.

13. A method for the production of sodium acetate which comprises passing ethyl alcohol into a finely divided reaction mixture containing a major proportion of sodium acetate and a minor proportion of sodium hydroxide while stirring and heating the reaction mixture at a temperature between 270° and 300° C.

WILBUR T. STEPHENSON.
EARL L. PELTON.